United States Patent
Alshawabkeh et al.

(10) Patent No.: US 10,359,960 B1
(45) Date of Patent: Jul. 23, 2019

(54) ALLOCATING STORAGE VOLUMES BETWEEN COMPRESSED AND UNCOMPRESSED STORAGE TIERS

(71) Applicant: EMC IP Holding Company LLC, Hopkinton, MA (US)

(72) Inventors: Malak Alshawabkeh, Franklin, MA (US); Owen Martin, Hopedale, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 46 days.

(21) Appl. No.: 15/649,955

(22) Filed: Jul. 14, 2017

(51) Int. Cl.
G06F 3/06 (2006.01)

(52) U.S. Cl.
CPC .......... G06F 3/0634 (2013.01); G06F 3/0638 (2013.01); G06F 3/0689 (2013.01)

(58) Field of Classification Search
CPC .............. G06F 3/00; G06F 3/06–0689; G06F 5/00–16; G06F 9/00–548; G06F 11/00–3696; G06F 12/00–16; G06F 13/00–4295; G06F 17/00–5095; G06F 2003/0691–0698; G06F 2009/3883; G06F 2009/45562–45595; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153
See application file for complete search history.

(56) References Cited

U.S. PATENT DOCUMENTS

| | | | | |
|---|---|---|---|---|
| 8,001,339 B1* | 8/2011 | Holdman | ............. | G06F 3/0607 |
| | | | | 711/156 |
| 8,935,493 B1* | 1/2015 | Dolan | ................... | G06F 3/0649 |
| | | | | 711/117 |
| 8,976,636 B1* | 3/2015 | Martin | ............. | G06F 17/30584 |
| | | | | 369/30.01 |
| 9,213,721 B1* | 12/2015 | Faibish | ............. | G06F 17/30221 |
| 9,280,550 B1* | 3/2016 | Hsu | ......................... | G06F 3/061 |
| 9,323,655 B1* | 4/2016 | Sahin | .................... | G06F 12/023 |
| 9,524,218 B1* | 12/2016 | Veprinsky | ........... | G06F 11/1469 |
| 2003/0058804 A1* | 3/2003 | Saleh | .................. | H04J 14/0295 |
| | | | | 370/254 |

(Continued)

OTHER PUBLICATIONS

Efficient Virtualization-Based Fault Tolerance; Tsao et al.; 2016 International Computer Symposium; Dec. 15-17, 2016 (Year: 2016).*

*Primary Examiner* — Daniel C. Chappell
(74) *Attorney, Agent, or Firm* — Anderson Gorecki LLP

(57) ABSTRACT

A method of allocating storage volumes between compressed and uncompressed storage tiers includes maintaining a respective state machine for each storage volume, each state machine maintaining a current state of the storage volume, a previous state of the storage volume, and a state machine timer based on when the respective storage volume last changed state. The method further includes allocating a first subset of the storage volumes to an uncompressed storage tier and allocating a second subset of storage volumes to a compressed storage tier, and determining storage volumes to be moved between the uncompressed and compressed storage tiers using a state machine evaluation process based on the state information of the state machines.

16 Claims, 6 Drawing Sheets

(56) References Cited

U.S. PATENT DOCUMENTS

| | | | |
|---|---|---|---|
| 2005/0080992 A1* | 4/2005 | Massey | G06F 3/0605 |
| | | | 711/114 |
| 2006/0077909 A1* | 4/2006 | Saleh | H04L 12/66 |
| | | | 370/254 |
| 2006/0123207 A1* | 6/2006 | Yamamoto | G06F 3/0605 |
| | | | 711/161 |
| 2009/0070541 A1* | 3/2009 | Yochai | G06F 3/0605 |
| | | | 711/165 |
| 2009/0144577 A1* | 6/2009 | Sarker | G06F 1/3225 |
| | | | 713/340 |
| 2011/0082842 A1* | 4/2011 | Groseclose, Jr. | G06F 3/0608 |
| | | | 707/693 |
| 2011/0264855 A1* | 10/2011 | Kasako | G06F 3/0607 |
| | | | 711/114 |
| 2012/0005233 A1* | 1/2012 | Matsumoto | G06F 17/30221 |
| | | | 707/797 |
| 2013/0318196 A1* | 11/2013 | Yamamoto | G06F 12/0871 |
| | | | 709/215 |
| 2014/0095448 A1* | 4/2014 | Marwah | G06F 17/30073 |
| | | | 707/667 |
| 2017/0090776 A1* | 3/2017 | Kowles | G06F 3/0608 |
| 2017/0103356 A1* | 4/2017 | Sabloniere | G06Q 10/06315 |
| 2018/0046381 A1* | 2/2018 | Fagiano | G06F 3/0608 |

* cited by examiner

500: Movement of storage volumes into compressed storage tier
502: Movement of storage volumes out of compressed storage tier
504: Movement of storage volumes into uncompressed storage tier
506: Movement of storage volumes out of uncompressed storage tier 500: Movement of storage volumes into compressed storage tier
502: Movement of storage volumes out of compressed storage tier
504: Movement of storage volumes into uncompressed storage tier
506: Movement of storage volumes out of uncompressed storage tier

ALLOCATING STORAGE VOLUMES BETWEEN COMPRESSED AND UNCOMPRESSED STORAGE TIERS

CROSS REFERENCE TO RELATED APPLICATIONS

None

BACKGROUND

This disclosure relates to computing systems and related devices and methods, and, more particularly, to allocating storage volumes between compressed and uncompressed storage tiers.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter which is set forth by the claims presented below.

All examples and features mentioned below can be combined in any technically possible way.

In one aspect, a non-transitory tangible computer readable storage medium is provided that has stored thereon a computer program for implementing a method of allocating storage volumes between compressed and uncompressed storage tiers. The computer program includes a set of instructions which, when executed by a computer, cause the computer to perform a method including the steps of maintaining a respective state machine for each storage volume, each state machine maintaining a current state of the storage volume, a previous state of the storage volume, and a state machine timer based on when the respective storage volume last changed state. The method further includes allocating a first subset of the storage volumes to an uncompressed storage tier and allocating a second subset of storage volumes to a compressed storage tier, and determining storage volumes to be moved between the uncompressed and compressed storage tiers using a state machine evaluation process based on the state information of the state machines.

In some implementations, the state machine timers indicate when the storage volumes were respectively most recently moved between the uncompressed and compressed storage tiers.

In certain implementations, the method further includes determining activity levels of the storage volumes to rank the storage volumes.

In some implementations, the step of determining storage volumes to be moved includes determining that a particular storage volume is in the compressed storage tier and has an activity level above a threshold activity level for promotion into the uncompressed storage tier, and not moving the particular storage volume from the compressed storage tier into the uncompressed storage tier where the state machine timer for the particular storage volume is below a movement time threshold.

In certain implementations, the step of determining storage volumes to be moved includes determining that a particular storage volume is in the compressed storage tier and has an activity level above a threshold activity level for promotion into the uncompressed storage tier, and moving the particular storage volume from the compressed storage tier into the uncompressed storage tier where the state machine timer for the particular storage volume is at or above a movement time threshold.

In some implementations, the step of determining storage volumes to be moved includes determining that a particular storage volume is in the uncompressed storage tier and has an activity level below a threshold activity level for demotion into the compressed storage tier, and not moving the particular storage volume from the uncompressed storage tier into the decompressed storage tier where the state machine timer for the particular storage volume is below a movement time threshold.

In certain implementations, the step of determining storage volumes to be moved includes determining that a particular storage volume is in the uncompressed storage tier and has an activity level below a threshold activity level for demotion into the compressed storage tier, and moving the particular storage volume from the uncompressed storage tier into the decompressed storage tier where the state machine timer for the particular storage volume is at or above a movement time threshold.

In another aspect, a data storage system includes a first set of storage resources forming an uncompressed storage tier, a second set of storage resources forming a compressed storage tier, and a controller for moving storage volumes between the uncompressed storage tier and compressed storage tier. The controller contains control logic which, when executed by a processor, causes the processor to perform a method including the steps of maintaining a respective state machine for each storage volume, each state machine maintaining a current state of the storage volume, a previous state of the storage volume, and a state machine timer based on when the respective storage volume last changed state. The method further includes allocating a first subset of the storage volumes to an uncompressed storage tier and allocating a second subset of storage volumes to a compressed storage tier, and determining storage volumes to be moved between the uncompressed and compressed storage tiers using a state machine evaluation process based on the state information of the state machines.

In some implementations, the state machine timers indicate when the storage volumes were respectively most recently moved between the uncompressed and compressed storage tiers.

In certain implementations, the data storage system further determines activity levels of the storage volumes to rank the storage volumes.

In some implementations, the step of determining storage volumes to be moved includes determining that a particular storage volume is in the compressed storage tier and has an activity level above a threshold activity level for promotion into the uncompressed storage tier, and not moving the particular storage volume from the compressed storage tier into the uncompressed storage tier where the state machine timer for the particular storage volume is below a movement time threshold.

In certain implementations, the step of determining storage volumes to be moved includes determining that a particular storage volume is in the compressed storage tier and has an activity level above a threshold activity level for promotion into the uncompressed storage tier, and moving the particular storage volume from the compressed storage tier into the uncompressed storage tier where the state machine timer for the particular storage volume is at or above a movement time threshold.

In some implementations, the step of determining storage volumes to be moved includes determining that a particular storage volume is in the uncompressed storage tier and has an activity level below a threshold activity level for demotion into the compressed storage tier, and not moving the particular storage volume from the uncompressed storage tier into the decompressed storage tier where the state machine timer for the particular storage volume is below a movement time threshold.

In certain implementations, the step of determining storage volumes to be moved includes determining that a particular storage volume is in the uncompressed storage tier and has an activity level below a threshold activity level for demotion into the compressed storage tier, and moving the particular storage volume from the uncompressed storage tier into the decompressed storage tier where the state machine timer for the particular storage volume is at or above a movement time threshold.

In some implementations, the data storage system further includes a decompression engine to decompress data of storage volumes in connection with reading of data from the compressed storage tier and in connection with movement of storage volumes from the compressed storage tier into the uncompressed storage tier.

In certain implementations, the data storage system further includes a compression engine to compress data of storage volumes in connection with writing data to the compressed storage tier and in connection with movement of storage volumes from the uncompressed storage tier into the compressed storage tier.

DETAILED DESCRIPTION

Aspects of the disclosure are generally related to data storage subsystems which are accessed via a network and, more particularly, to allocating storage volumes between compressed and uncompressed storage tiers.

Figure 1:
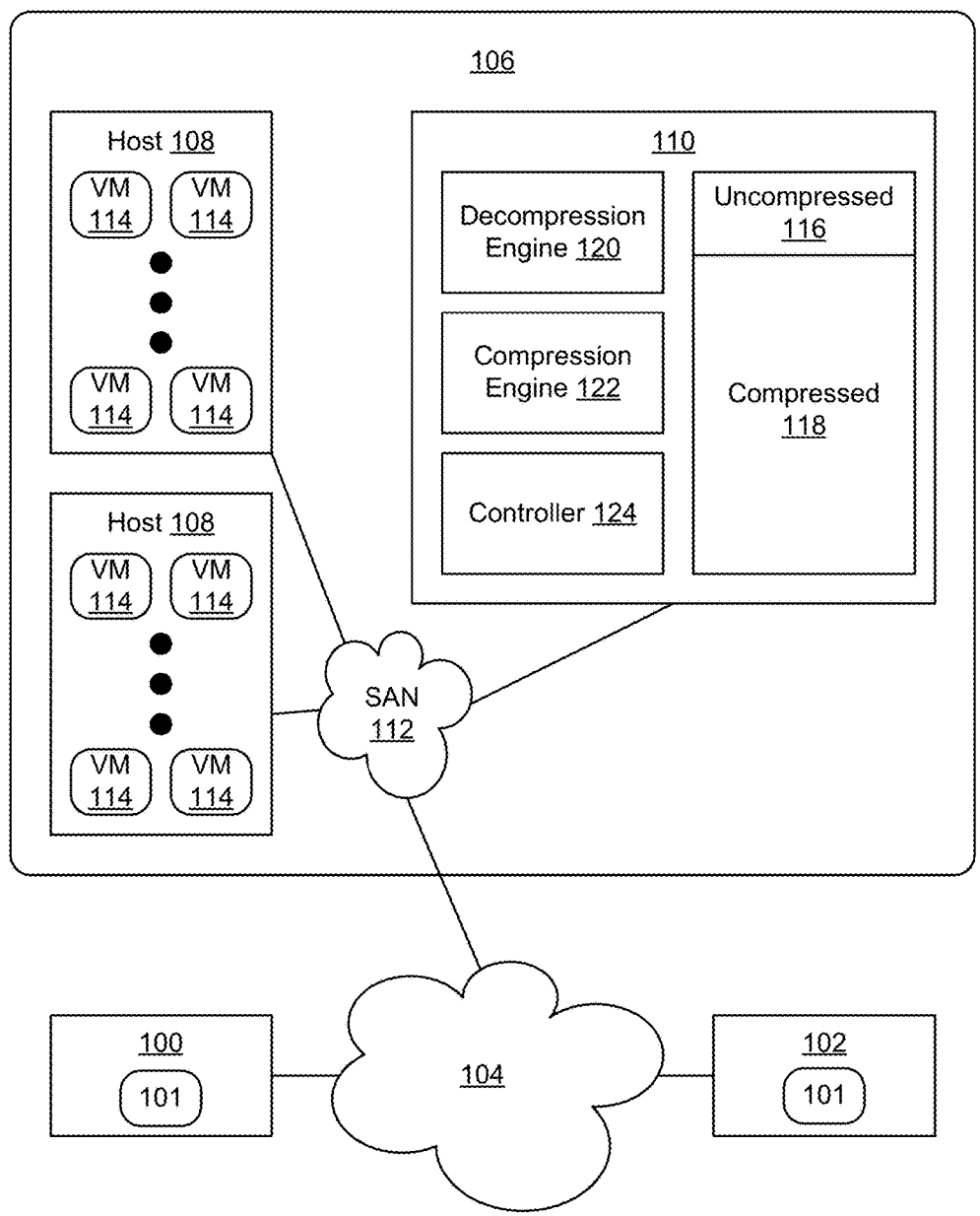
FIG. 1 is a functional block diagram of an example data storage subsystem configured to allocate storage volumes between compressed and uncompressed storage tiers according to an embodiment.

FIG. 1 illustrates a simplified network environment in which applications 101 running on computer devices such as user terminal 100 and server 102 utilize a network 104 to access data maintained by a data storage subsystem 106. The data storage subsystem includes multiple hosts 108 and at least one storage array 110. The hosts 108 and storage array 110 are in communication via a storage area network 112. Hosts 108 typically run data processing applications such as database applications and email servers, just for example and without limitation. More particularly, each host 108 instantiates multiple virtual machines 114, and each virtual machine 114 typically supports one data processing application. The applications 101 on the computer devices 100, 102 communicate with the data processing applications running on the virtual machines 114, and can prompt an IO request as a result of those communications.

More particularly, a host 108 prompts IOs on behalf of a data processing application by signaling to the storage array 110 in a format that can be processed by the storage array 110. For example, if the data processing application prompts the host to generate a Read IO request for a set of data, then the host 108 may generate a corresponding Small Computer System Interface (SCSI) Read request and send that Read request to the storage array 110. The storage array 110 responds by providing the data associated with the Read request to the host 108. The host 108 provides the data to the data processing application on the virtual machine 114 that prompted the Read IO. The data may also be sent from the host 108 to the application 101 on computer device 100, 102 that prompted the IO.

Computer data is vital to the operations of many organizations. Consequently, systems have been developed to protect data and maintain data availability. Enterprise data storage arrays 110, for example, are used to maintain and protect relatively large data sets. An enterprise data storage subsystem 106 includes at least one enterprise storage array 110 which is accessed via the host devices 108. The storage array 110 typically includes multiple physical storage devices (not shown). Technologies such as RAID and remote site mirroring may be used to help maintain availability and avoid data loss.

The storage resources of the storage array 110 may be organized into tiers based on performance in order to help provide both high performance and high capacity at a practical cost. Applications 101 and devices 100, 102, generally access data in the storage array 110 by sending IOs to the host devices 108. The host devices 108 communicate with the storage array 110 to Read or Write the corresponding data.

Storage resources may be organized in hierarchical tiers within the storage array 110. Different storage tiers may have different capabilities, and data IO from the storage array 110 may be may be optimized by controller 124 by causing data to be stored and moved between storage tiers based on IO activity levels. For example, data that is infrequently needed may be moved to a lower performing storage tier and data that is frequently needed may be moved to a higher performing storage tier.

Within a storage tier, or in a storage array 110 that is formed using all solid state (flash) memory, storage tiers may be defined based on whether the data to be stored in the tiers is compressed or uncompressed. Data may be compressed to reduce the amount of memory required to store the data within the storage array. However, when compressed data is to be accessed, the data must be decompressed which adds to the latency of retrieving the data from the storage system.

As shown in FIG. 1, in some implementations, the storage array 110 has an uncompressed storage tier 116 and a compressed storage tier 118. Storage volumes 210 that are more frequently accessed are preferably allocated to and stored in the uncompressed storage tier 116, and storage volumes 210 that are less frequently accessed are preferably compressed prior to storage and are allocated to and stored in the compressed storage tier 118.

A decompression engine 120 is used to decompress data when data from a storage volume 210 is to be read from compressed storage tier 118. Decompression engine 120 is also used to decompress data from a storage volume 210 when a storage volume 210 is to be moved from the compressed storage tier 118 to the uncompressed storage tier 116.

A compression engine 122 is used to compress data when data from a storage volume 210 is to be written to compressed storage tier 118. Compression engine 122 is also used to compress data when a storage volume 210 is to be moved from the uncompressed storage tier 116 to the compressed storage tier 118.

A controller 124 controls allocation of storage volumes between compressed and uncompressed storage tiers. One example controller 124 is discussed below in connection with FIG. 2. As data of a storage volume 210 becomes more active, controller 124 may move the storage volume 210 to the uncompressed storage tier 116. As data of a storage volume 210 becomes less active, controller 124 may move the storage volume 210 to the compressed storage tier 118. Systems for determining the activity levels of storage volumes 210 are well known and the controller may use any known or to be developed method to determine the relative activity levels of the storage volumes within the storage array. According to an implementation, a storage machine evaluation process uses the activity levels of the storage volumes, as well as other state information of state machines associated with the storage volumes, to determine allocations of storage volumes between compressed and uncompressed storage tiers.

Only a certain percentage of data, referred to herein as "hot" data, of the total capacity of the storage array 110 can be tagged and held in the uncompressed storage tier 118. When the uncompressed storage tier 116 budget becomes full, it is necessary to evict data to free up space, i.e., to keep a certain margin of free capacity in the uncompressed storage tier 116 by issuing compress data movements where the target will be a compressed storage tier 118.

In some embodiments, when determining whether to move data from the uncompressed tier 116 to the compressed tier, data in the storage volume 210 that is the candidate for movement is evaluated to determine the compressibility of the data contained in the storage volume. If the data is not compressible, it may be preferable to not move the data to the compressed tier since moving the data will cause increased access latency without significant storage space savings.

When the uncompressed storage tier 116 is running low in hot data, hot data that is stored in the compressed storage tier 118 should be de-compressed and moved from the compressed storage tier 118 to the uncompressed storage tier 116.

Maintaining a quantity of more frequently accessed storage volumes in the uncompressed storage tier 116 allows the storage system 106 to deliver maximum throughput, levering cache and SSD technology and helps to ensure that system resources are available when required. However, if the hot data of the working set of a workload cannot be effectively held within the uncompressed storage tier 116, then constant data swapping, i.e. thrashing, may occur between compressed and uncompressed tiers, causing performance degradation.

According to some implementations, each storage volume 210 (also referred to herein as an extent) of data that is stored in storage array 110 is associated with a respective state machine 200. In some implementations an extent of data is a data volume having a data size of approximately 220 MB. Extents having other sizes may be used as well.

Figure 2:
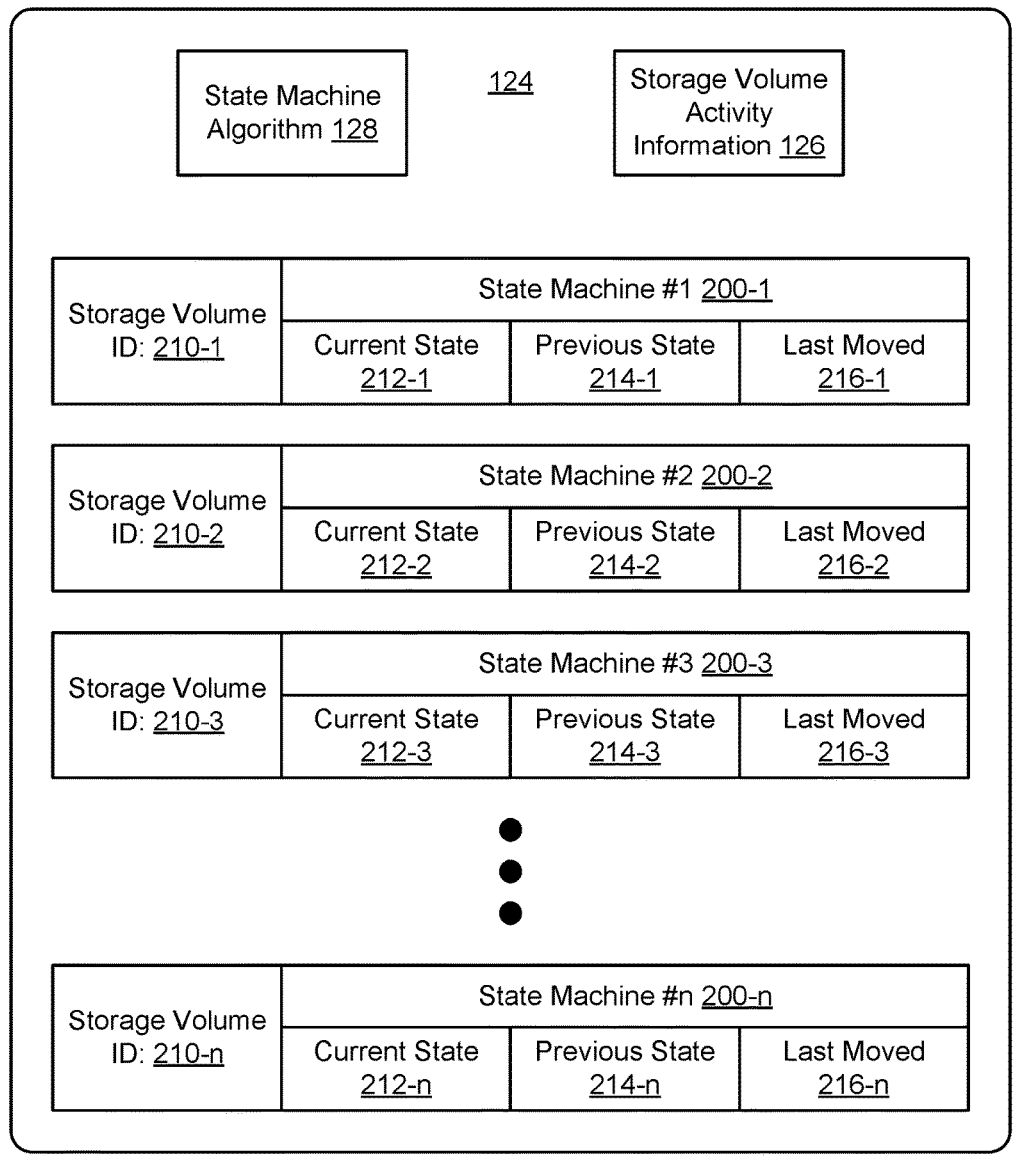
FIG. 2 is a functional block diagram of an example controller configured to allocate storage volumes between compressed and uncompressed storage tiers according to an embodiment.

FIG. 2 shows an example controller configured to implement a state machine evaluation process 128, which uses a state machine 200 for each storage volume 210, to allocate storage volumes 210 between compressed 218 and uncompressed 216 storage tiers. As shown in FIG. 124, the controller 124 obtains storage volume activity information 126 and uses the storage volume activity information to rank storage volumes 210 based on activity level. In some implementations the ranking is implemented by state machine evaluation process 128. In other implementations the controller 124 may use other data structures to keep track of the activity levels of the storage volumes 210, and rank the storage volumes. Any known or to be developed method may be used to obtain the activity information about storage volumes and rank the storage volumes relative to each other.

The controller 124, in some implementations, maintains a state machine 200 for each storage volume 210. For example, as shown in FIG. 2, a first state machine 200-1 is maintained for extent #1 210-1, a second state machine 200-2 is maintained for extent #2 210-2, a third state machine 200-3 is maintained for extent #3 210-3, etc. Although the state machines are shown as included "in" controller 124, it should be understood that the state machines 200 may be maintained by processes outside of the controller process 124, and the states of the state machines 200 may thus be accessed as needed by controller 124. The particular manner in which the state machines 200 are hosted will depend on the implementation, and the invention is not limited to implementing the state machines 200 by or within the controller process 124. Rather, the state machines 200 are shown in FIG. 2 as part of the controller process 124 for ease of illustration and explanation.

Each state machine 200 keeps track of the current state 212 of the storage volume 210. In some implementations the current state 212 of the storage volume is either hot or cold, depending on whether the storage volume is hot (assigned to the uncompressed storage tier 116) or cold (assigned to the compressed storage tier 118). In some implementations each state machine 200 also keeps track of the previous state 214 of the storage volume. Keeping track of the previous state 214 allows the state machine to have a record as to whether the storage volume was previously hot or cold during a previous evaluation cycle. Each state machine 200 also maintains an indication of when the storage volume was last moved 216 from the compressed storage tier 118 to the uncompressed storage tier 116, or from the uncompressed storage tier 116 to the compressed storage tier 118.

Figure 3:
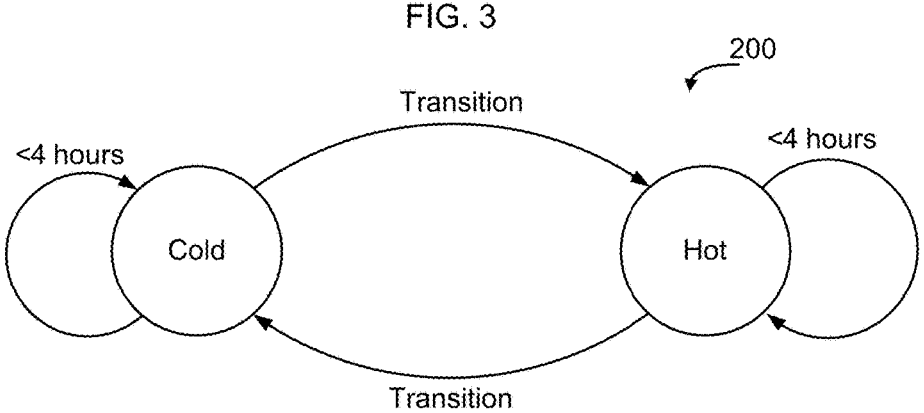
FIG. 3 is a state machine diagram configured to maintain state information about one of the storage volumes in connection with allocating storage volumes between compressed and uncompressed storage tiers according to an embodiment.

FIG. 3 shows an example state machine 200. As shown in FIG. 3, the state machine 200 keeps track of events and has one or more timers. One of the events that is tracked by the state machine include the locality of data IO accesses—when data in the storage volume 210 was last accessed, was the storage volume 210 in the uncompressed storage tier 116 or in the compressed storage tier 118. The state machine also keeps track of when the storage volume 210 was last moved—either from the uncompressed storage tier 116 to the compressed storage tier 118, or from the compressed storage tier 118 to the uncompressed storage tier 116. The state machine also keeps track of whether the storage volume 210 was previously marked as hot or cold.

In some implementations, every two hours all of the state machines 200 are evaluated to determine whether storage volume 210 associated with the respective state machine 200 should be moved between uncompressed and compressed storage tiers 116, 118. Although the state machine evaluation process in some implementations occurs every two hours, in other implementations the state machine evaluation process could occur more frequently or less frequently.

If a state machine is in the hot state, when the state machine evaluation process is triggered, the controller 124 will check if transitioning to the other state is possible. For that to occur, the storage volume 210 has to show less/low IO activity compared to other storage volumes 210 in the system, and the storage volume 210 associated with the state machine shouldn't have moved recently.

The amount of time an extent is required to stay within a given storage tier before becoming eligible for movement will be referred to herein as a "hold period". In some implementations, the hold period is set to four hours (two evaluation cycles), such that regardless of the current activity level of the storage volume 210 relative to other storage volumes 210 in the system, the storage volume 210 will not be eligible to be moved to a different storage tier until after expiration of the hold period.

Although an implementation will be described in which the evaluation cycle is two hours and the hold period is four hours, in other implementations other length evaluation cycles and hold periods may be used. In some implementations as noted herein, the hold period is longer than the evaluation cycle. In other implementations the hold period may be coincident with the evaluation cycle.

When the hold period expires (after 4 hours in this example implementation), a storage volume 210 will be eligible for demotion to the compressed storage tier. The state machine evaluation process will compare the activity level of the respective storage volume 210 against activity levels of other storage volumes. If enough other storage volumes 210 have higher activity levels, the storage volume 210 will have its state changed from hot to cold, and it will be moved from the uncompressed storage tier 116 to the compressed storage tier 118.

For data that is cold, having a sudden increase in IO activity has no effect. That is—a sudden spike in workload does not cause the storage volume 210 to change state. However, if the activity level is sufficiently constant to cause the storage volume 210 to be one of the most active storage volumes 210, and the storage volume 210 has not moved recently (hasn't moved during the hold period), the storage volume will be shifted from the cold state to the hot state during the next evaluation cycle. Changing state from cold to hot will cause the storage volume 210 to be moved from the compressed storage tier 118 to the uncompressed storage tier 116.

When controller 124 starts controlling a set of storage volumes 210, initially all storage volumes 210 are in a cold state 200, preventing data from being decompressed. Since none of the last two events occurred (nothing has moved yet or been marked hot), only the first event (locality of data IO access) is considered initially, so when IO statistics are collected, in a frequency of a 10 minute window, and a two hour history of IO patterns is built, the state machine evaluation process 128 is triggered and will start defining which storage volumes 210 should be transitioned to the hot state.

The state machine evaluation process 128 uses storage volume activity information 126 to construct a ranking list of top active extents where the list size is within the hot data capacity budget—i.e. no more than 20% of active capacity can be marked hot. If hot data currently stored in the compressed storage tier 118, then a decompression movement task is dispatched to the decompression engine 120 to move the hot storage volume 210 to the uncompressed storage tier 116. If cold data is stored in the uncompressed storage tier 116, a compression movement task is dispatched to the compression engine 122 to place the cold storage volume 210 in the compressed storage tier 118.

Frequent toggling between hot and cold states is blocked with the state machine evaluation process 128, therefore the possibility of having a given storage volume swapped constantly between the compressed and uncompressed storage tiers is low to effectively prevent thrashing.

One alternative way of reducing thrashing is to use a hysteresis mechanism to try to quell movement of storage volumes between compressed and uncompressed storage tiers. For example, if the activity levels of all extents are plotted, an extent must be hotter than a first threshold (high threshold) to be promoted to the uncompressed storage tier 116, and must be lower than a second, lower, threshold (low threshold) to be demoted to the compressed storage tier 118. By spacing these thresholds apart a particular distance, thrashing of storage volumes between storage tiers can be somewhat quelled.

Figure 4:
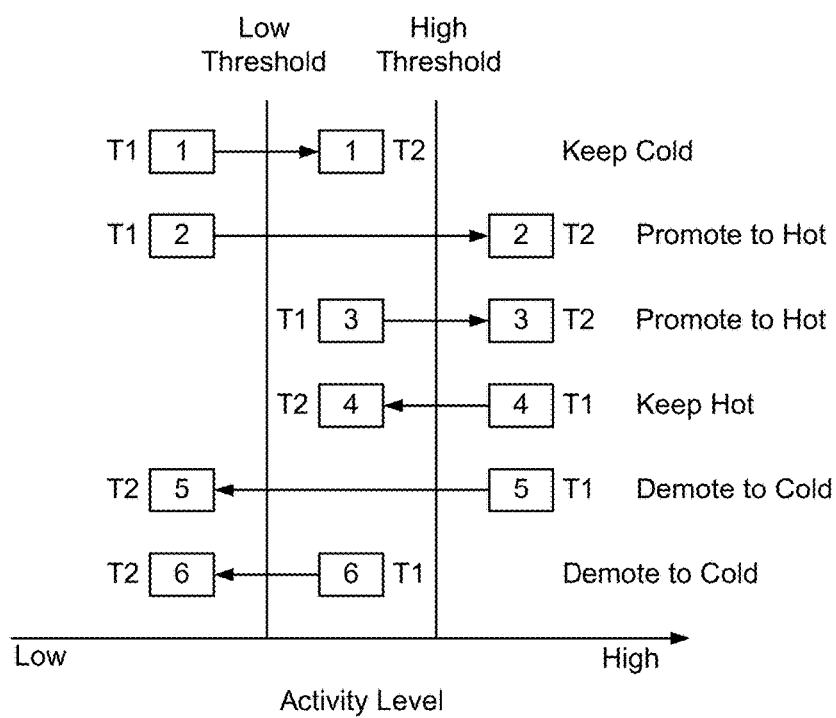
FIG. 4 is a graph showing use of hysteresis to allocate storage volumes between compressed and uncompressed storage tiers.

FIG. 4 graphically illustrates the use of a hysteresis mechanism to reduce thrashing. As shown in FIG. 4, previous and current activity levels of extents in the storage system are compared to the low threshold and high threshold. In FIG. 4, the changes in activity levels of six storage volumes (labeled boxes 1-6) are graphically plotted. The first storage volume (labeled box 1), at time T1, initially had an activity level below the low threshold. The activity level of the first storage volume at time T2 has increased above the low threshold, but has not increased beyond the high threshold. Because the high threshold is used to determine promotion, the first storage volume will remain in the cold state at time T2 and will remain in the compressed storage tier 118.

Storage volume 2 was initially at a low level at time T1, but at time T2 its activity has increased beyond the high threshold. Storage volume 2 will be promoted to the hot state and moved from the compressed storage tier 118 to the uncompressed storage tier 116. Storage volume 3 was initially in the cold state even though it was above the cold threshold at time T1. However, the increase in activity level of storage volume 3 at time T2 has caused storage volume 3 to cross the high threshold, thus causing storage volume 3 to be promoted to the hot state and moved from the compressed storage tier 118 to the uncompressed storage tier 116.

Storage volume 4 was initially in the hot state at time T1. At time T2 the activity level of storage volume 4 has dropped below the high threshold but still remains above the low threshold. Since the low threshold is used for demotion decisions, storage volume 4 will remain hot and will not be moved from the uncompressed storage tier.

Storage volume 5 was initially in the hot state at time T1. At time T2 the activity level of extent 5 has dropped below the low threshold. Accordingly, storage volume 5 will be demoted to the cold state and moved from the uncompressed storage tier 116 to the compressed storage tier 118.

Storage volume 6 was initially in the hot state at time T1, even though the activity level of extent 6 at time T1 had fallen below the high threshold. At time T2 the activity level of extent 6 had fallen below the low threshold. Accordingly, storage volume 6 will be demoted to the cold state and moved from the uncompressed storage tier 116 to the compressed storage tier 118.

As can be seen, by adjusting the high and low thresholds it is possible to somewhat control thrashing—repetitive movement of extents between the uncompressed and compressed storage tiers. However, it was found that hysteresis alone is difficult to control since setting the thresholds may vary for different storage systems and data access patterns. Likewise there may be a large number of extents that have approximately the same activity levels. If the extents fall close to the thresholds, it can be possible for extents with similar activity levels to be repeatedly moved between the compressed and uncompressed storage tiers.

To demonstrate the efficacy of the state machine evaluation process and compare the efficacy of the state machine evaluation process 128 against a hysteresis based process, an experiment was conducted. Specifically, 8 k thin provisioned devices were configured, and 8 k snaps were setup. 3.6 million extents (around 748 TB of data) were configured with IO running to all 16 k devices (both source and target). The workloads have 50% random read miss and 50% random write.

Figure 5:
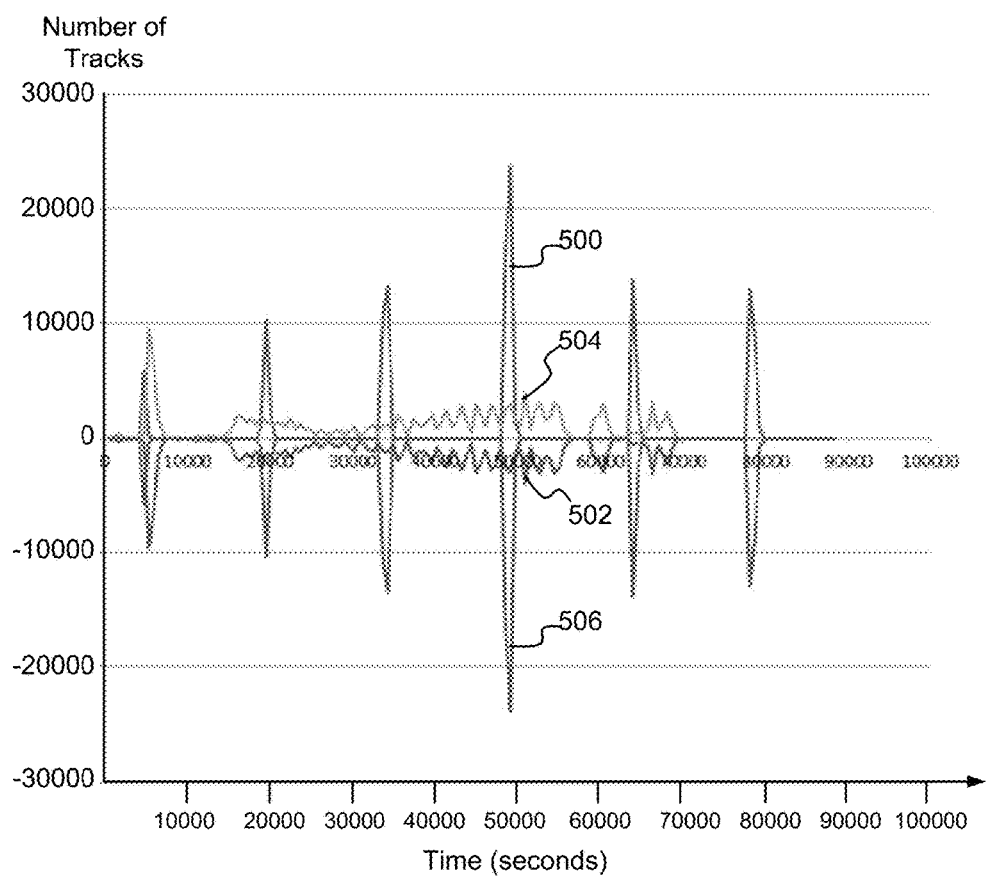
FIG. 5 is a graph showing experimental results of the use of hysteresis to allocate storage volumes between compressed and uncompressed storage tiers.
Figure 6:
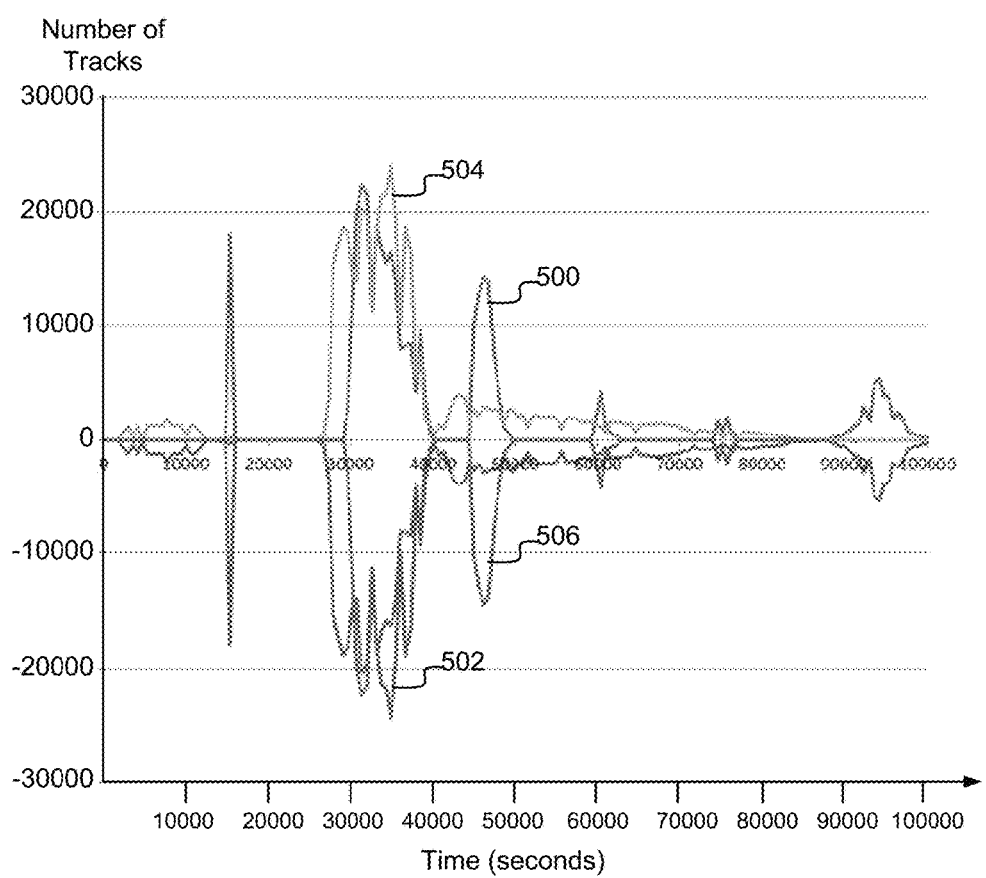
FIG. 6 is a graph showing experimental results of the use of a state machine evaluation process to allocate storage volumes between compressed and uncompressed storage tiers.

FIGS. 5 and 6 are plots that show the ingress/egress results of compressing/decompressing tracks. FIG. 5 shows the number of compression/decompression movements over time when hysteresis is used, and FIG. 6 shows the number of compression/decompression movements over time when the state machine evaluation process 128 was used.

As shown in FIG. 5, the use of hysteresis did not prevent thrashing, which occurs when the system continuously moves ingress/egress tracks between compressed and decompressed pools. As shown in FIG. 5, the hysteresis process exhibited large periodic spikes in movement of extents between the compressed storage tier 118 and uncompressed storage tier 116. The large movements of extents did not diminish with time but rather periodically occurred during each evaluation cycle.

As shown in FIG. 6, the use of the state machine evaluation process 128 initially had a large amount of storage volume movement, between about 0 seconds and 40,000 seconds. The large initial large amount of storage volume movement is believed to be attributable to the fact that initially all extents were started in the cold state, and the storage system needed some time to adjust the extents into a more rational hot/cold distribution. However, once the initial distribution occurred, after approximately 50,000 seconds, the system stabilized and large periodic compression/decompression spikes did not reappear. This is contrasted with the hysteresis plot which continues to show periodic thrashing that is not diminishing as much with time.

In FIGS. 5 and 6, each plot has four traces: Trace 500 shows the number of storage volumes being moved into the compressed storage tier 118. Trace 506 is the mirror image of trace 500, and shows the number of storage volumes 210 being moved out of the uncompressed storage tier 116. Trace 504 shows the number of storage volumes 210 being moved into the uncompressed storage tier 116. Trace 502 is the mirror image of trace 504, and shows the number of storage volumes being moved out of the compressed storage tier 118.

Figure 7:
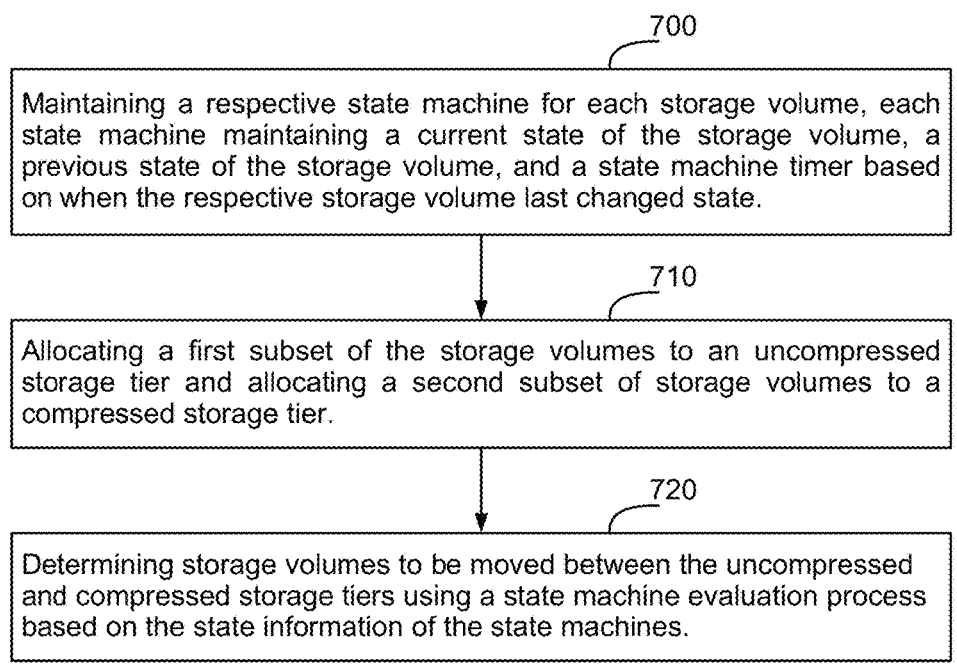
FIG. 7 is a flow chart of an example method of allocating storage volumes between compressed and uncompressed storage tiers according to an embodiment.

FIG. 7 is a flow chart of an example process of allocating storage volumes between compressed and uncompressed storage tiers according to an embodiment. In the implementation shown in FIG. 7, at block 700 the process maintains a respective state machine for each storage volume, each state machine maintaining a current state of the storage volume, a previous state of the storage volume, and a state machine timer based on when the respective storage volume last changed state. At block 710, the process allocates a first subset of the storage volumes to an uncompressed storage tier and allocating a second subset of storage volumes to a compressed storage tier. At block 720, the process determines storage volumes to be moved between the uncompressed and compressed storage tiers using a state machine evaluation process based on the state information of the state machines.

The following reference numbers are used in the drawings:

100 user terminal
101 application
102 server
104 network
106 data storage subsystem
108 host
110 storage array
112 storage area network
114 virtual machine
116 uncompressed storage tier
118 compressed storage tier
120 decompression engine
122 compression engine
124 controller
126 storage volume activity information
128 state machine evaluation process
200 state machine
202 cold state
204 hot state
210 storage volume
212 current state
214 previous state
216 last moved The methods described herein may be implemented as software configured to be executed in control logic such as contained in a CPU of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible computer readable medium such as random access memory, a computer memory, a disk, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for implementing a method of allocating storage volumes between compressed and uncompressed storage tiers, the computer program including a set of instructions which, when executed by a computer, cause the computer to perform a method comprising the steps of:
    maintaining a respective state machine for each storage volume, each state machine maintaining a current compression state of the storage volume, a previous compression state of the storage volume at a previous evaluation period, and a state machine timer based on when the respective storage volume last changed compression state from an uncompressed state to a compressed state or from the compressed state to the uncompressed state;
    allocating a first subset of the storage volumes to an uncompressed storage tier and allocating a second subset of storage volumes to a compressed storage tier;
    determining storage volumes to be moved between the uncompressed and compressed storage tiers using a state machine evaluation process based on the compression state information of the state machines and the state machine timers of the state machines; and
    moving the storage volumes that are determined to be moved between the uncompressed and compressed storage tiers;
    wherein a storage volume will be moved from the compressed storage tier to the uncompressed storage tier if the activity level of the storage volume is above an activity level threshold and the state machine timer of the storage volume is above a timer threshold.

2. The non-transitory tangible computer readable storage medium of claim 1, wherein the state machine timers indicate when the storage volumes were respectively most recently moved between the uncompressed and compressed storage tiers.

3. The non-transitory tangible computer readable storage medium of claim 2, further comprising determining activity levels of the storage volumes to rank the storage volumes.

4. The non-transitory tangible computer readable storage medium of claim 3, wherein the step of determining storage volumes to be moved comprises determining that a particular storage volume is in the compressed storage tier and has an activity level above a threshold activity level for promotion into the uncompressed storage tier, and not moving the particular storage volume from the compressed storage tier into the uncompressed storage tier where the state machine timer for the particular storage volume is below a movement time threshold.

5. The non-transitory tangible computer readable storage medium of claim 3, wherein the step of determining storage volumes to be moved comprises determining that a particular storage volume is in the compressed storage tier and has an activity level above a threshold activity level for promotion into the uncompressed storage tier, and moving the particular storage volume from the compressed storage tier into the uncompressed storage tier where the state machine timer for the particular storage volume is at or above a movement time threshold.

6. The non-transitory tangible computer readable storage medium of claim 3, wherein the step of determining storage volumes to be moved comprises determining that a particular storage volume is in the uncompressed storage tier and has an activity level below a threshold activity level for demotion into the compressed storage tier, and not moving the particular storage volume from the uncompressed storage tier into the compressed storage tier where the state machine timer for the particular storage volume is below a movement time threshold.

7. The non-transitory tangible computer readable storage medium of claim 3, wherein the step of determining storage volumes to be moved comprises determining that a particular storage volume is in the uncompressed storage tier and has an activity level below a threshold activity level for demotion into the compressed storage tier, and moving the particular storage volume from the uncompressed storage tier into the compressed storage tier where the state machine timer for the particular storage volume is at or above a movement time threshold.

8. A data storage subsystem, comprising:
    a first set of storage resources forming an uncompressed storage tier;
    a second set of storage resources forming a compressed storage tier;
    a controller for moving storage volumes between the uncompressed storage tier and compressed storage tier, the controller containing control logic which, when executed by a processor, causes the processor to perform a method comprising the steps of:
    maintaining a respective state machine for each storage volume, each state machine maintaining a current compression state of the storage volume, a previous compression state of the storage volume at a previous evaluation period, and a state machine timer based on when the respective storage volume last changed compression state from an uncompressed state to a compressed state or from the compressed state to the uncompressed state;
    allocating a first subset of the storage volumes to the uncompressed storage tier and allocating a second subset of storage volumes to the compressed storage tier; and
    determining storage volumes to be moved between the uncompressed and compressed storage tiers using a state machine evaluation process based on the compression state information of the state machines and the state machine timers of the state machines; and
    moving the storage volumes that are determined to be moved between the uncompressed and compressed storage tiers;
    wherein a storage volume will be moved from the compressed storage tier to the uncompressed storage tier if the activity level of the storage volume is above an activity level threshold and the state machine timer of the storage volume is above a timer threshold.

9. The data storage subsystem of claim 8, wherein the state machine timers indicate when the storage volumes were respectively most recently moved between the uncompressed and compressed storage tiers.

10. The data storage subsystem of claim 9, further comprising determining activity levels of the storage volumes to rank the storage volumes.

11. The data storage subsystem of claim 10, wherein the step of determining storage volumes to be moved comprises determining that a particular storage volume is in the compressed storage tier and has an activity level above a threshold activity level for promotion into the uncompressed storage tier, and not moving the particular storage volume from the compressed storage tier into the uncompressed storage tier where the state machine timer for the particular storage volume is below a movement time threshold.

12. The data storage subsystem of claim 10, wherein the step of determining storage volumes to be moved comprises determining that a particular storage volume is in the compressed storage tier and has an activity level above a threshold activity level for promotion into the uncompressed storage tier, and moving the particular storage volume from the compressed storage tier into the uncompressed storage tier where the state machine timer for the particular storage volume is at or above a movement time threshold.

13. The data storage subsystem of claim 10, wherein the step of determining storage volumes to be moved comprises determining that a particular storage volume is in the uncompressed storage tier and has an activity level below a threshold activity level for demotion into the compressed storage tier, and not moving the particular storage volume from the uncompressed storage tier into the compressed storage tier where the state machine timer for the particular storage volume is below a movement time threshold.

14. The data storage subsystem of claim 10, wherein the step of determining storage volumes to be moved comprises determining that a particular storage volume is in the uncompressed storage tier and has an activity level below a threshold activity level for demotion into the compressed storage tier, and moving the particular storage volume from the uncompressed storage tier into the compressed storage tier where the state machine timer for the particular storage volume is at or above a movement time threshold.

15. The data storage subsystem of claim 8, further comprising a decompression engine to decompress data of storage volumes in connection with reading of data from the compressed storage tier and in connection with movement of storage volumes from the compressed storage tier into the uncompressed storage tier.

16. The data storage subsystem of claim 8, further comprising a compression engine to compress data of storage volumes in connection with writing data to the compressed storage tier and in connection with movement of storage volumes from the uncompressed storage tier into the compressed storage tier.

* * * * *